United States Patent
Ferreira et al.

(10) Patent No.: US 11,412,348 B2
(45) Date of Patent: Aug. 9, 2022

(54) ELECTRONIC DEVICES WITH LOCATION COORDINATES OBTAINED FROM MOBILE DEVICES

(71) Applicant: HEWLETT-PACKARD DEVELOPMENT COMPANY, L.P., Houston, TX (US)

(72) Inventors: Ronaldo Rod Ferreira, Porto Alegre (BR); Christopher Charles Mohrman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 878 days.

(21) Appl. No.: 16/076,152

(22) PCT Filed: Jun. 30, 2017

(86) PCT No.: PCT/US2017/040402
§ 371 (c)(1),
(2) Date: Aug. 7, 2018

(87) PCT Pub. No.: WO2019/005126
PCT Pub. Date: Jan. 3, 2019

(65) Prior Publication Data
US 2021/0204088 A1    Jul. 1, 2021

(51) Int. Cl.
*H04W 4/02*       (2018.01)
*H04W 4/029*      (2018.01)
(Continued)

(52) U.S. Cl.
CPC .............. *H04W 4/023* (2013.01); *G01S 15/46* (2013.01); *H04W 4/027* (2013.01); *H04W 4/029* (2018.02);
(Continued)

(58) Field of Classification Search
CPC combination set(s) only.
See application file for complete search history.

(56) References Cited

U.S. PATENT DOCUMENTS 7,852,262 B2    12/2010  Namineni et al.
9,154,908 B2 *  10/2015  Bahl ..................... H04W 4/029
(Continued)

FOREIGN PATENT DOCUMENTS

| CN | 105392111   | 3/2016 |
| CN | 106415721   | 2/2017 |
| CN | 104469679 B | 5/2018 |

OTHER PUBLICATIONS

Patwari et al., "Relative Location in Wireless Networks", Retrieved from internet—https://pdfs.semanticscholar.org/ad29/b1d1caee6d57fc4d68683b56be87de90bbe9.pdf, 2011, 5 Pages.

*Primary Examiner* — Steven S Kelley
(74) *Attorney, Agent, or Firm* — Conley Rose PC

(57) ABSTRACT

In some examples, an electronic device of a localization system comprises a wireless transceiver to exchange data with a mobile device and a processor. The electronic device obtains, from the mobile device, location coordinates of the mobile device. The location coordinates of the mobile device are set as location coordinates of the electronic device. A beacon package comprising an identifier of the electronic device and the location coordinates of the electronic device is generated. The beacon package is transmitted to a local device in proximity to the electronic device.

20 Claims, 9 Drawing Sheets

(51) Int. Cl.
  *H04W 4/80* (2018.01)
  *G01S 15/46* (2006.01)
  *H04W 64/00* (2009.01)
(52) U.S. Cl.
  CPC ........... *H04W 4/80* (2018.02); *H04W 64/006* (2013.01); *G01S 2015/465* (2013.01)

(56) References Cited

U.S. PATENT DOCUMENTS

| | | | |
|---|---|---|---|
| 9,244,149 B2 | 1/2016 | Piersol et al. | |
| 9,628,958 B1* | 4/2017 | McBurney | H04W 4/027 |
| 2007/0287476 A1* | 12/2007 | Jeong | H04W 76/10 |
| | | | 455/456.6 |
| 2009/0278682 A1 | 11/2009 | Liu | |
| 2013/0045759 A1 | 2/2013 | Smith | |
| 2014/0274108 A1* | 9/2014 | Venkatraman | G01S 5/0263 |
| | | | 455/456.1 |
| 2014/0287783 A1* | 9/2014 | Czompo | H04W 4/027 |
| | | | 455/456.6 |
| 2015/0350946 A1 | 12/2015 | Das et al. | |
| 2016/0050531 A1* | 2/2016 | Choi | H04W 4/027 |
| | | | 455/456.2 |
| 2016/0066147 A1* | 3/2016 | Venkatraman | H04W 4/023 |
| | | | 455/456.2 |
| 2016/0165570 A1 | 6/2016 | Kim et al. | |
| 2016/0198322 A1* | 7/2016 | Pitis | H04W 4/80 |
| | | | 455/420 |
| 2016/0212579 A1 | 7/2016 | Duan et al. | |
| 2016/0219549 A1 | 7/2016 | Wong et al. | |
| 2017/0003931 A1 | 1/2017 | Dvortsov et al. | |
| 2017/0041451 A1* | 2/2017 | Wilkinson | H04W 4/027 |
| 2017/0171849 A1* | 6/2017 | Bolin | H04W 72/044 |
| 2018/0239932 A1* | 8/2018 | Gummeson | H04W 4/027 |

* cited by examiner

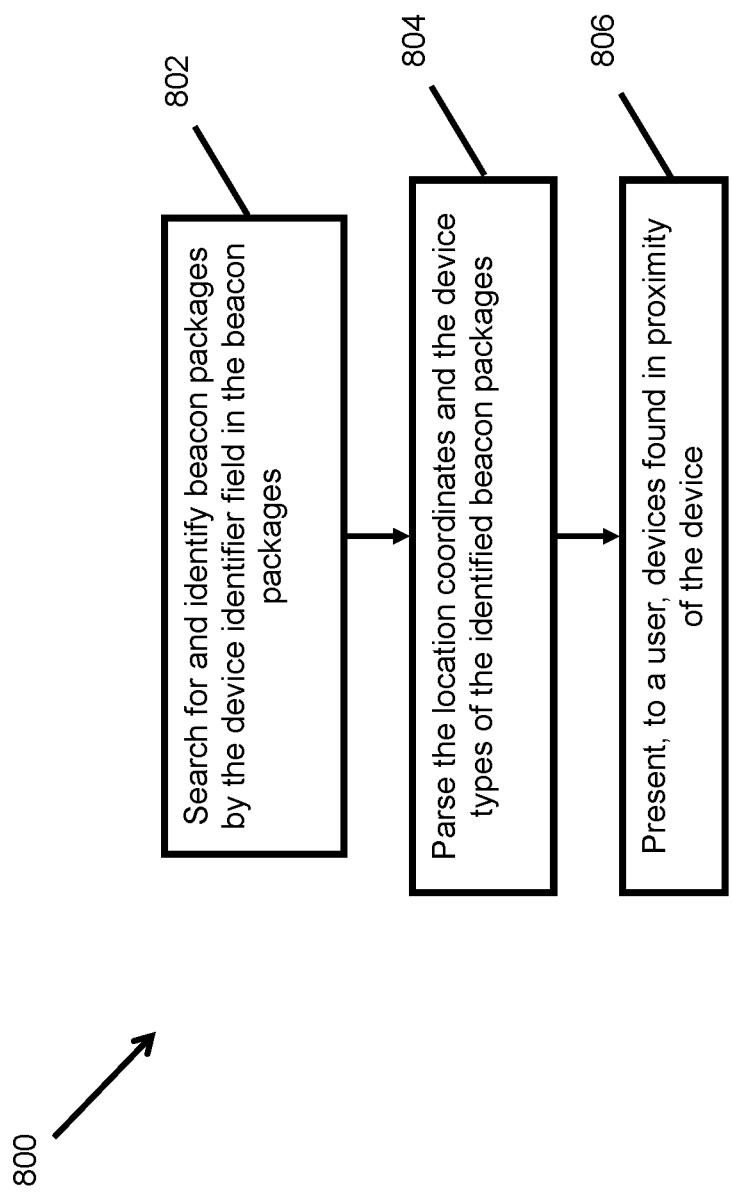

ELECTRONIC DEVICES WITH LOCATION COORDINATES OBTAINED FROM MOBILE DEVICES

BACKGROUND

Electronic devices—such as mobile phones, notebooks, laptop computers, tablets, printers, and workstations—are valuable assets in the corporate context and are carefully inventoried and tracked.

BRIEF DESCRIPTION OF THE DRAWINGS

Various examples are described below referring to the following figures:

FIG. 8 depicts a flow diagram of a method for determining the information displayed on the display device of FIG. 7, in accordance with various examples.

DETAILED DESCRIPTION

Figure 1:
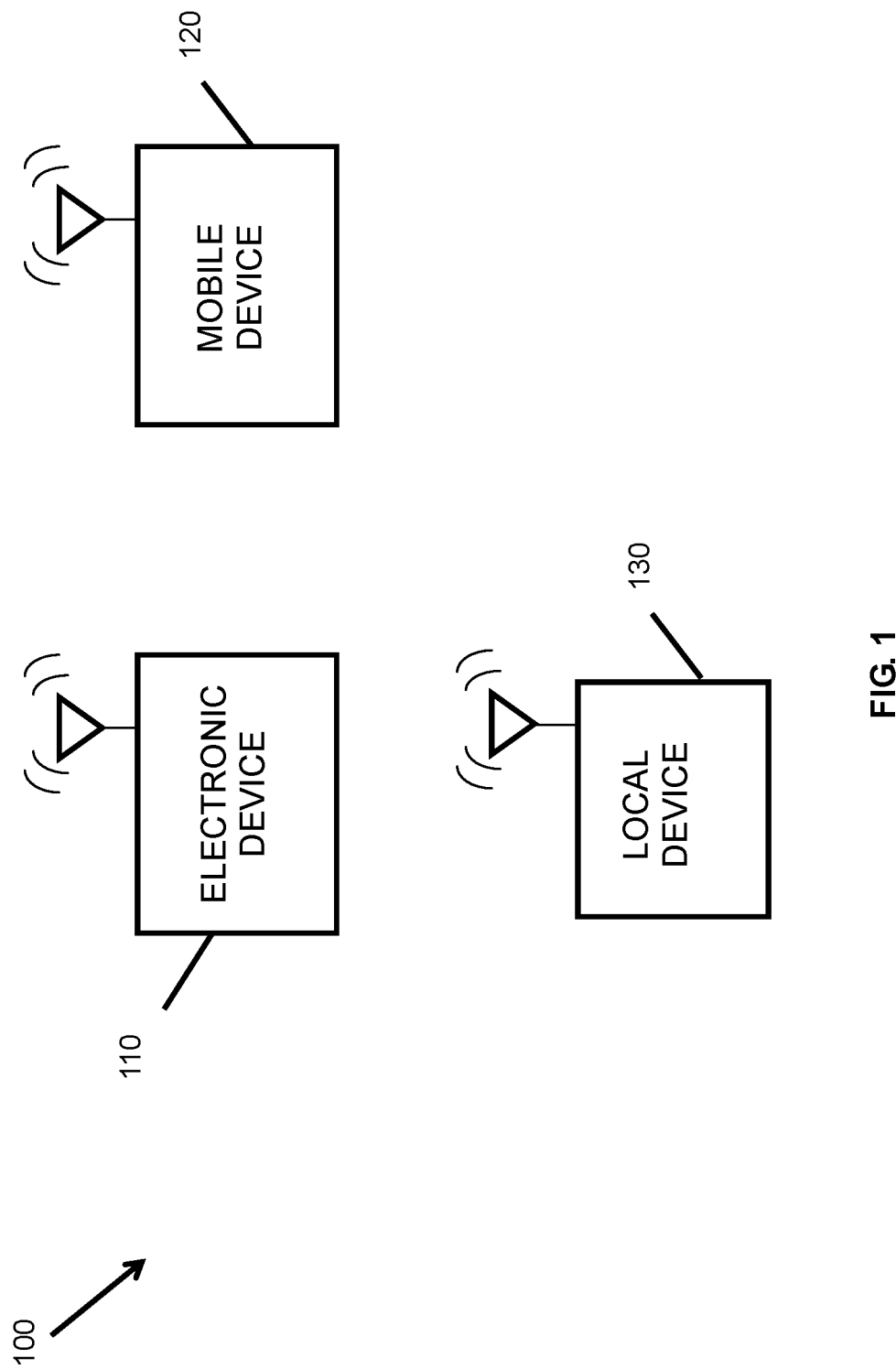
FIG. 1 depicts a location system comprising an electronic device that is to assume the location coordinates of a co-located mobile device, in accordance with various examples.

To improve tracking of electronic device assets, a technique called indoor positioning is frequently used to identify the types and locations of electronic devices in an indoor space, such as an office building. Indoor positioning typically entails the trilateration of beacon signals emitted by various electronic devices in an enclosed area. The effectiveness of indoor positioning is limited, however, by the number of electronic devices in the area that can broadcast beacon signals accurately specifying the devices' locations. An increase in the number of such electronic devices generally results in an increase in the accuracy and effectiveness of indoor positioning efforts.

This disclosure presents various examples of systems and techniques for increasing the number of electronic device beacon signals in a given area. In particular, the systems and techniques leverage the fact that persons carrying around electronic devices—such as notebooks or tablets—are also likely carrying mobile devices that contain positioning circuits, such as global positioning system (GPS) units. When an accelerometer in the electronic device or the mobile device indicates that the person has stopped moving and is at least temporarily stationary, the electronic device wirelessly obtains the location coordinates of the mobile device and broadcasts a beacon signal (or "beacon package") containing the location coordinates of the mobile device, which the electronic device has assumed as its own, since the two devices are co-located. In this way, the electronic device serves as at least a temporary source of a beacon package.

When the electronic device is located within peer-to-peer wireless communication distance of at least two other beacon package sources, a fourth device entering the area may use trilateration techniques to identify and locate the three beacon package sources. In this way, the devices acting as beacon package sources are tracked and can be used for any suitable purpose (e.g., printing to the nearest printer). In areas where only two beacon package sources were previously available, the disclosed examples make trilateration (and, thus, indoor positioning) possible where previously it was not possible (due to the requirement for at least three beacon packages to perform trilateration). In areas where at least three beacon package sources were previously available, the disclosed examples can improve the accuracy and effectiveness of indoor positioning.

In some examples, a device comprises a processor and a wireless transceiver to exchange data with a mobile device. The processor may obtain, from the mobile device, location coordinates of the mobile device, set the location coordinates of the mobile device as location coordinates of the electronic device, generate a beacon package comprising an identifier of the electronic device and the location coordinates of the electronic device, and transmit the beacon package to a local device in proximity to the electronic device. In some examples, the processor may monitor accelerometer data of the electronic device. In some examples, the processor may obtain the location coordinates of the mobile device in response to an indication in the accelerometer data that the electronic device is stationary. In some examples, the processor may cease transmission of the beacon package in response to the accelerometer data indicating that the electronic device is not stationary. In some examples, the location coordinates of the mobile device comprise GPS coordinates. In some examples, the electronic device may be in short-range wireless communication with the mobile device. In some examples, the processor may establish a Bluetooth pairing with the mobile device. In some examples, the beacon package may be modified to include at least one of a device type, a user identifier, or custom metadata.

In some examples, a location system comprises a first electronic device, a second electronic device, a third electronic device, and a fourth electronic device. The first electronic device may wirelessly communicate with a mobile device containing a positioning circuit and may broadcast a first beacon package with first location coordinates from the positioning circuit. The second electronic device may broadcast a second beacon package with second location coordinates of the second electronic device. The third electronic device may broadcast a third beacon package with third location coordinates of the third electronic device. The fourth electronic device may perform a trilateration operation with the first, second, and third beacon packages to determine a location of the fourth electronic device relative to the first, second, and third electronic devices. The fourth electronic device may display information pertaining to the first, second, and third electronic devices based on the location. In some examples, the first electronic device may obtain the first location coordinates from the positioning circuit in response to an accelerometer indicating that the first electronic device is stationary. In some examples, the first electronic device may obtain the first location coordinates from the positioning circuit in response to an accelerometer indicating that the mobile device is stationary. In some examples, the information may comprise identifiers associated with the first, second, and third electronic devices and distances between the fourth electronic device and each of the first, second, and third electronic devices. In some examples, at least one of the second and third electronic devices may comprise a stationary device.

In some examples, a non-transitory machine-readable storage medium comprises instructions to monitor accelerometer data from an accelerometer, instructions to obtain location coordinates of a mobile device from the mobile device in response to the accelerometer data indicating that the accelerometer is stationary, instructions to set the location coordinates of the mobile device as location coordinates of the electronic device, instructions to generate a beacon package comprising an identifier of the electronic device and the location coordinates of the electronic device, and instructions to transmit the beacon package to a local device in proximity to the electronic device. In some examples, the storage medium may be modified to include instructions to cease transmission of the beacon package in response to the accelerometer data indicating that the accelerometer is not stationary.

FIG. 1 illustrates an example location system 100. In this example, the location system 100 comprises an electronic device 110, a mobile device 120, and a local device 130. In accordance with various examples, the electronic device 110 may be a laptop, notebook, or any other portable electronic device that is capable of wireless communication. The mobile device 120 may be a cellular phone, a tablet, a smart watch, or any other portable electronic device that is capable of determining its own location coordinates, such as GPS coordinates. In addition, the local device 130 comprises any device capable of wireless communication as part of a local network. For example, the local device 130 can be another laptop, another notebook, a printer, a workstation, a network hub, a radio frequency tag, or other, similar devices that are part of the location system 100. The location system 100 is well-suited for short range applications such as indoor positioning and tracking applications. For example, the location system 100 may be deployed within an indoor environment, such as an office building. The location system 100 can be utilized in short- to medium-range outdoor applications and in a combination of indoor and outdoor applications, as well.

In some examples, electronic device 110 lacks a positioning circuit. In such examples, the electronic device 110 is to broadcast location coordinates—for example, GPS coordinates, Global Navigation Satellite System (GLONASS) coordinates, or GALILEO coordinates—obtained from the mobile device 120 and describing a location of the mobile device 120. Assuming that the mobile device 120 is co-located with the electronic device 110, the location coordinates of the electronic device 110 are identical or nearly identical to those of the mobile device 102. As used herein and by way of example, the mobile device 120 is co-located with the electronic device 110 when the two devices are within about 1 foot of each other, and/or when the mobile device 120 is within radio range of the electronic device 110, such that the wireless signal can be detected. For example, in Bluetooth® communication, the wireless range can be determined by received signal strength indicator (RSSI). In this way, the electronic device 110 leverages the mobile device 120 to broadcast beacon packages specifying the location of the mobile device 120, which is close to the actual location of the electronic device 110. The electronic device 110 generates and broadcasts a beacon package to indicate its location, and another device, such as the local device 130, receives and processes the beacon package to determine the location of the electronic device 110. Having determined the location of the electronic device 110 and having further determined that the electronic device 110 is suitably close to the local device 130, the local device 130 may interact with the electronic device 110—for instance, by transferring data to or receiving data from the electronic device 110.

Figure 2:
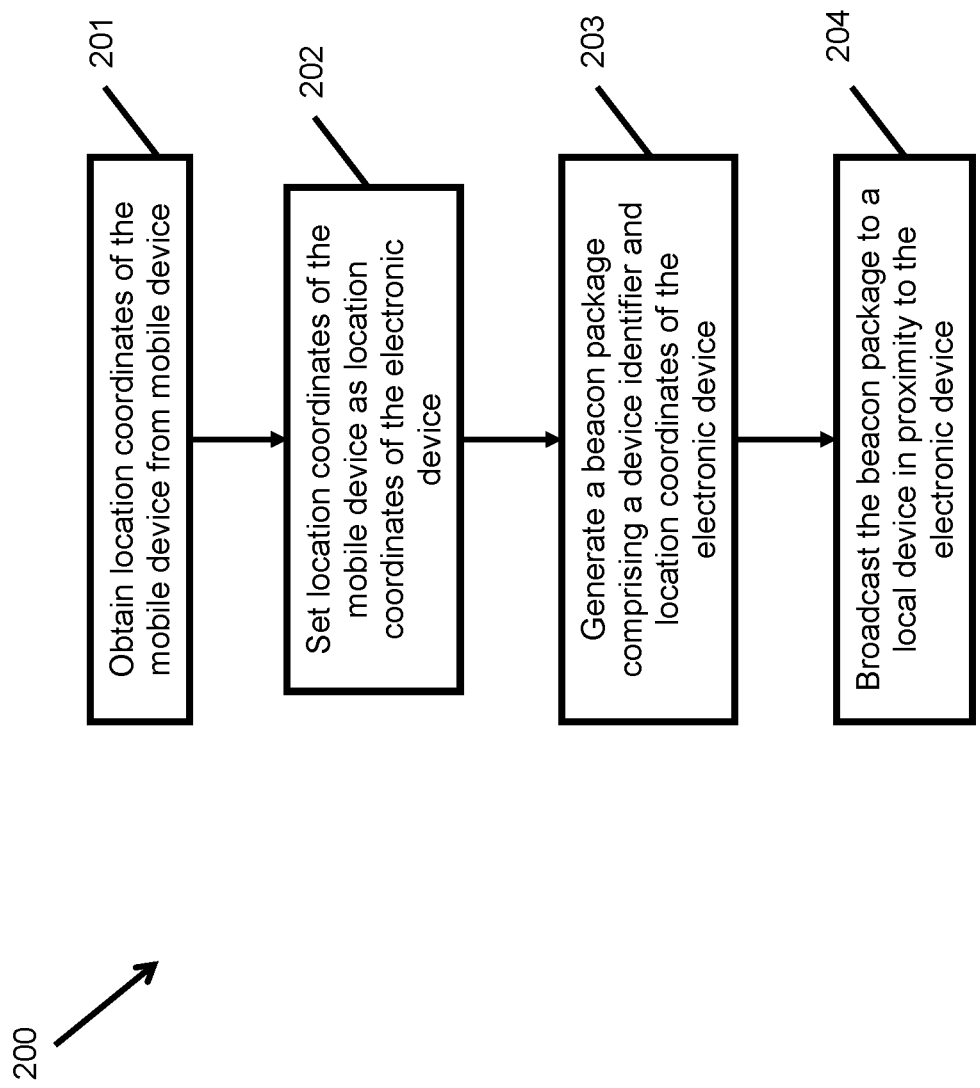
FIG. 2 depicts a flow diagram of a location method in which an electronic device assumes the location coordinates of a co-located mobile device, in accordance with various examples.

FIG. 2 depicts a flow diagram of a location method 200 in accordance with various examples. In some examples, the electronic device 110 performs each step of the method 200. Referring to both FIGS. 1 and 2, the method 200 begins with the electronic device 110 obtaining, from the mobile device 120, location coordinates of the mobile device 120 (step 201). To obtain these location coordinates of the mobile device 120, the electronic device 110 may establish a wireless connection with the mobile device 120. For example, there may be a short-range wireless communication connection between the two devices. Various suitable short-range wireless communication technologies include Bluetooth®, near field communication (NFC), infrared (IR), IEEE 802.15.4, and Wi-Fi. When the mobile device 120 is in short-range wireless communication with the electronic device 110, the two devices may be in sufficient proximity (e.g., 1 foot) to each other for the electronic device 110 to set the mobile device 120 location coordinates as the location coordinates of the electronic device 110. Accordingly, the method 200 next comprises the electronic device 110 setting the location coordinates of the mobile device 120 as the location coordinates of the electronic device 110 (step 202). For instance, the electronic device 110 may comprise a software register that specifies the location coordinates of the electronic device 110, and the electronic device 110 may write the location coordinates of the mobile device 120 into that software register, possibly overwriting any other coordinates or data that may be stored in the register at that time. The example method 200 also includes the electronic device 110 generating a beacon package comprising an identifier of the electronic device 110 and the location coordinates of the electronic device 110 (step 203). The identifier of the electronic device 110 may also be stored in another software register or some other suitable location and can comprise, for example, a numerical, alphabetical, or alphanumeric identifier. In some examples, the location coordinates of the electronic device 110 that are incorporated into the beacon package are the same location coordinates that were obtained from the mobile device 120 in step 201. The example method 200 additionally comprises the electronic device 110 broadcasting the beacon package, including to the local device 130, which is in proximity to the electronic device 110 (step 204). As used herein, the term "proximity" is used to describe devices within peer-to-peer wireless communication range.

In some examples, the electronic device 110 obtains location coordinates from the mobile device 120 when both the electronic device 110 and the mobile device 120 are stationary. If the mobile device 120 is moving, the location coordinates that the electronic device 110 obtains from the mobile device 120 will rapidly become outdated. If the mobile device 120 is stationary but the electronic device 110 is moving, the devices are no longer co-located, and so the electronic device 110 cannot properly use the location coordinates of the mobile device 120. If both devices are stationary, however, the electronic device 110 may properly obtain and broadcast the location coordinates of the mobile device 120 as its own. Accordingly, in some examples, the electronic device 110 uses movement data from movement indicators (e.g., accelerometers) in one or both of the devices to determine whether either device is moving.

In some examples, the determination of whether the electronic device 110 is stationary is based on monitoring movement using accelerometer data. In one example and with reference to FIG. 3A, the electronic device 110 comprises a processor 311, a wireless transceiver 312 to exchange data with the mobile device 120, and an accelerometer 313 to indicate movement of the electronic device 110. The electronic device 110 additionally comprises storage 314 (e.g., random access memory, read-only memory), also referred to herein as a non-transitory computer-readable medium, that stores executable code 316 (e.g., software, firmware) which, when executed by the processor 311, causes the processor 311 to perform some or all of the actions attributed herein to the electronic device 110. The mobile device 120 comprises a processor 322 and a positioning circuit 323 (e.g., a GPS unit). In addition, the mobile device 120 comprises storage 324 (e.g., random access memory, read-only memory), also referred to herein as a non-transitory computer-readable medium, that stores executable code 325. When executed by the processor 322, the executable code 325 causes the processor 322 to perform some or all of the actions attributed herein to the mobile device 120. The processor 311 obtains and processes the accelerometer data. Specifically, when the accelerometer data indicates that the electronic device 110 is stationary, the electronic device 110 obtains location coordinates from the mobile device 120 via the wireless transceiver 312. The mobile device 120 may obtain its location coordinates from the positioning circuit 323. After the mobile device location coordinates are received from the mobile device 120, the electronic device 110 can generate a beacon package as is described herein. In this example, it is assumed that when the electronic device 110 is stationary, the mobile device 120 is also stationary.

Figure 3A:
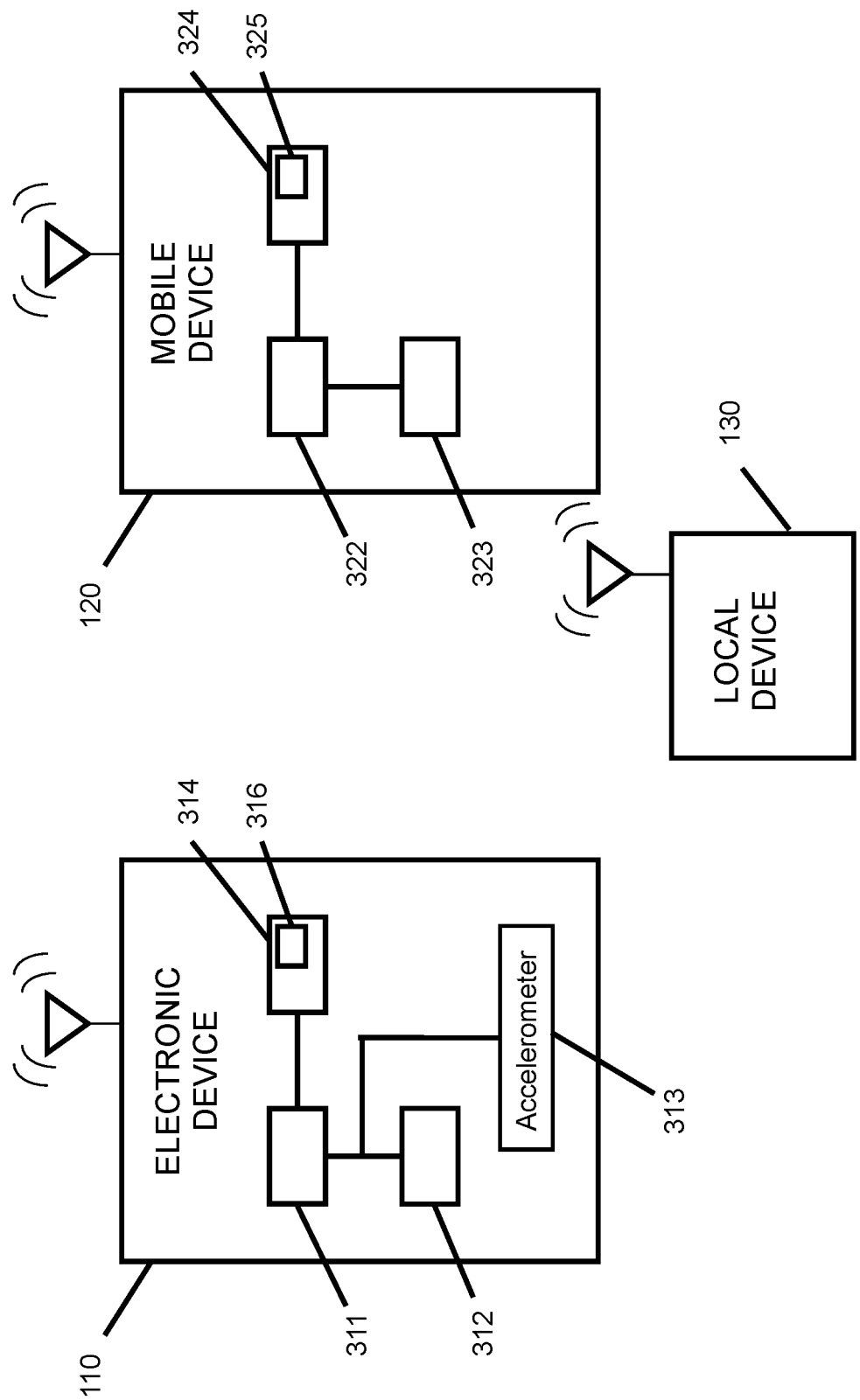
FIG. 3A depicts the location system of FIG. 1 in greater detail and in accordance with various examples.
Figure 3B:
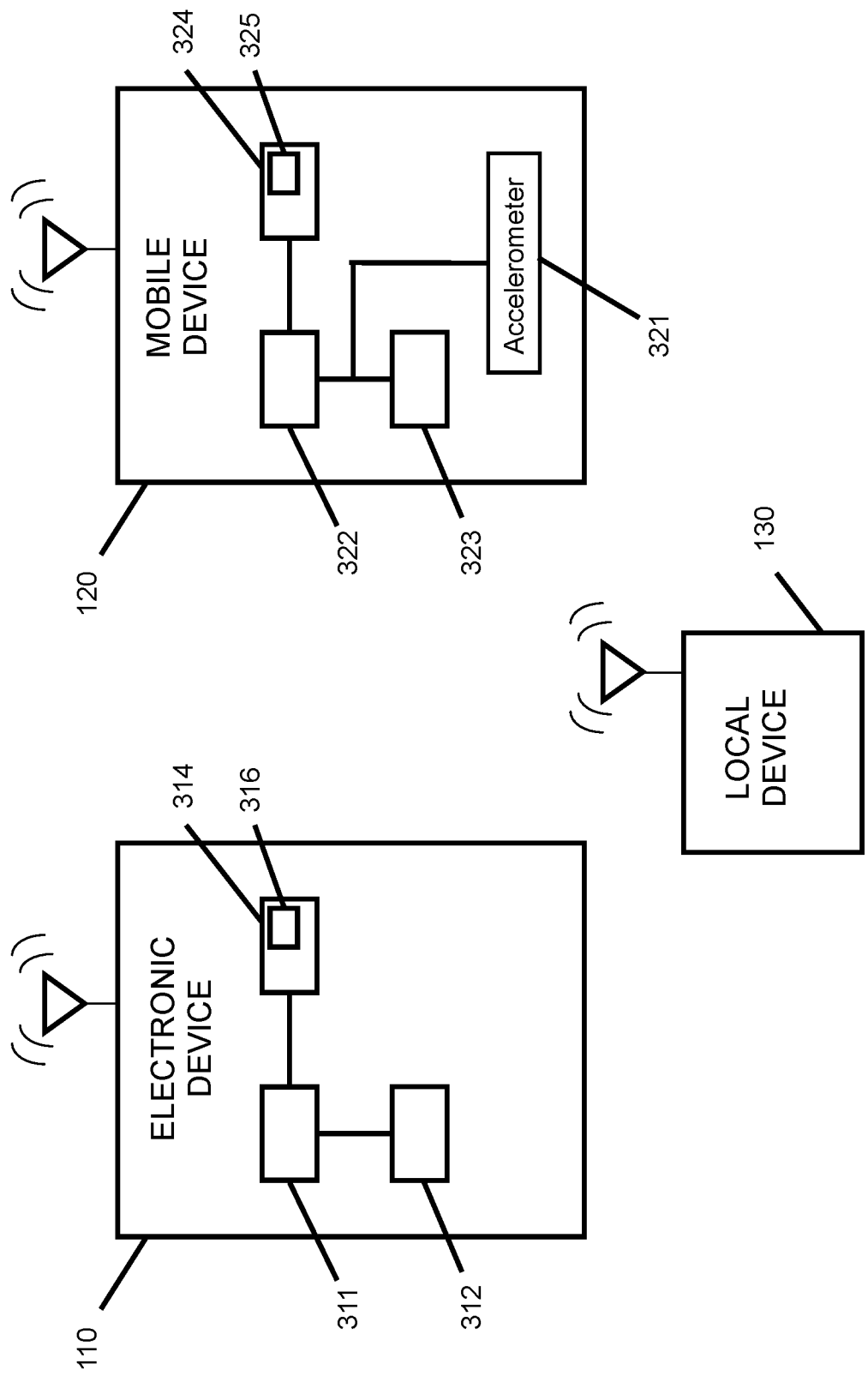
FIG. 3B depicts the location system of FIG. 1 in greater detail and in accordance with various examples.

In another example and with reference to FIG. 3B, the electronic device 110 comprises a processor 311 and a wireless transceiver 312 to exchange data with the mobile device 120 but does not include an accelerometer and instead relies on movement data provided by the mobile device 120. The mobile device 120 comprises an accelerometer 321, the processor 322 to monitor accelerometer data from the accelerometer 321 to determine if the mobile device 120 is moving or stationary, and the positioning circuit 323. In addition, the mobile device 120 comprises storage 324 (e.g., random access memory, read-only memory), also referred to herein as a non-transitory computer-readable medium, that stores executable code 325. As explained above, when executed by the processor 322, the executable code 325 causes the processor 322 to perform some or all of the actions attributed herein to the mobile device 120. If stationary, the mobile device 120 can transmit a message to the electronic device 110. The message may contain the mobile device 120 location coordinates, an indicator that the mobile device 120 is stationary, or a combination thereof. When the electronic device 110 is provided the indicator that the mobile device 120 is stationary but is not provided the mobile device 120 location coordinates, the electronic device 110 can request the mobile device 120 location coordinates from the mobile device 120. Once the electronic device 110 receives the location coordinates of the mobile device 120, the electronic device 110 may broadcast a beacon package containing the mobile device location coordinates, as explained above.

Although FIGS. 3A and 3B depict the accelerometer in either of the electronic device 110 and the mobile device 120, in some examples, each of the electronic device 110 and the mobile device 120 may include its own accelerometer. In such examples, the electronic device 110 may not obtain location coordinates from the mobile device 120 and broadcast the location coordinates unless both accelerometers provide movement data indicating that the electronic device 110 and the mobile device 120 are both stationary. Regardless of the precise conditions, a beacon package broadcast by the electronic device 110 is referred to herein as a "dynamic beacon" or a "dynamic beacon package."

In either scenario described above, when the accelerometer data indicates movement, the electronic device 110 ceases transmitting the beacon package. Once the accelerometer data indicates the device(s) having the accelerometer(s) are stationary again, the electronic device 110 re-establishes itself as a dynamic beacon source by obtaining current location coordinates and generating a new dynamic beacon package for transmission.

Figure 4:
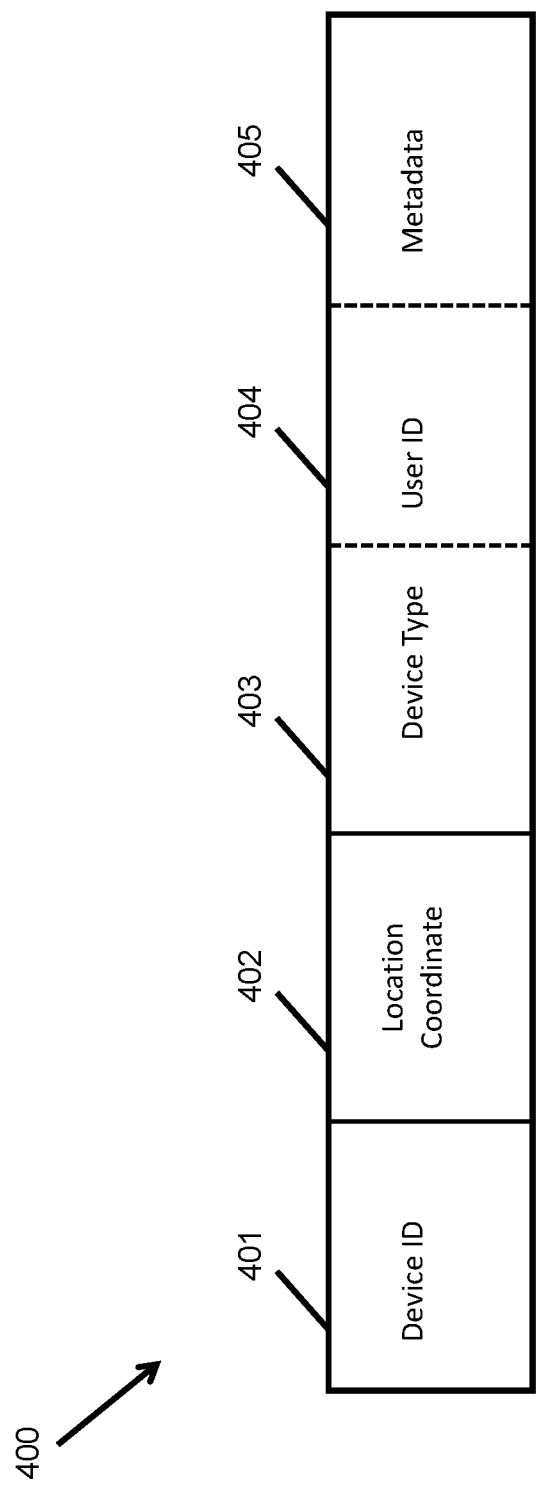
FIG. 4 is a conceptual representation of a dynamic beacon in accordance with various examples.

FIG. 4 depicts an example dynamic beacon package 400 transmitted by the electronic device 110. The example dynamic beacon package 400 comprises a device identifier 401 of the electronic device 110 and location coordinates 402 of the electronic device 110, which, as explained above, are set from the location coordinates of the mobile device 120. The example dynamic beacon package 400 further includes a device type 403 of the electronic device 110, a user identifier 404 of the electronic device 110, custom metadata 405 of the electronic device 110, or any combination thereof, as the dashed lines in FIG. 4 indicate. For example, the example dynamic beacon package 400 can be a tuple of the form <device identifier, location coordinate, device type, user's name, custom metadata>. The device identifier 401 of the electronic device can be a constant value set during manufacture or it can be a value set after manufacture. For example, the device identifier 401 of the electronic device can be set by an information technology (IT) administrator. The device identifier 401 can be a token or a unique name. In addition, the device identifier 401 of the electronic device can be used to create filters, in case a device can only search for a specific device identifier. Therefore, the device identifier 401 of the electronic device can be used to create groups and establish entitlements. The device type 403 may specify that the electronic device 110 is a notebook, a mobile phone, a tablet, or another such device. Further, the user identifier 404 can be the name of the electronic device user and used for tracking a user as described below. The custom metadata 405 can be the capabilities of the electronic device. For example, custom metadata can indicate whether the device is connected to a printer, has universal serial bus (USB) ports, or access control information such as whether a user has access to a determined set of third devices in the network.

The location system 100 also includes "static beacons," which are typically beacon signals broadcast by any of a set of managed IT devices that are stationary. By "stationary," it is meant that the device is fixed into place or that the device is not the type that is customarily moved on a regular basis (e.g., large printers, workstations). In the location system 100, stationary devices are provisioned as static beacon sources. Stationary devices have their location coordinates statically assigned, such as by an IT administrator. A person is positioned next to the stationary device and with a positioning device, such as a smart phone, he/she collects the current location coordinates of the positioning device. The person may then program the stationary device with the coordinates of the positioning device. In some examples, the stationary device may couple to and communicate with a positioning device, and the two devices may work in tandem to provide the stationary device with the coordinates of the positioning device. In some examples, the stationary device may communicate with another device on a network, such as an enterprise network, and it may obtain location coordinates from another entity on the network. When the stationary device collects its location coordinates from any of the foregoing sources, it may form a static beacon package.

Figure 5:
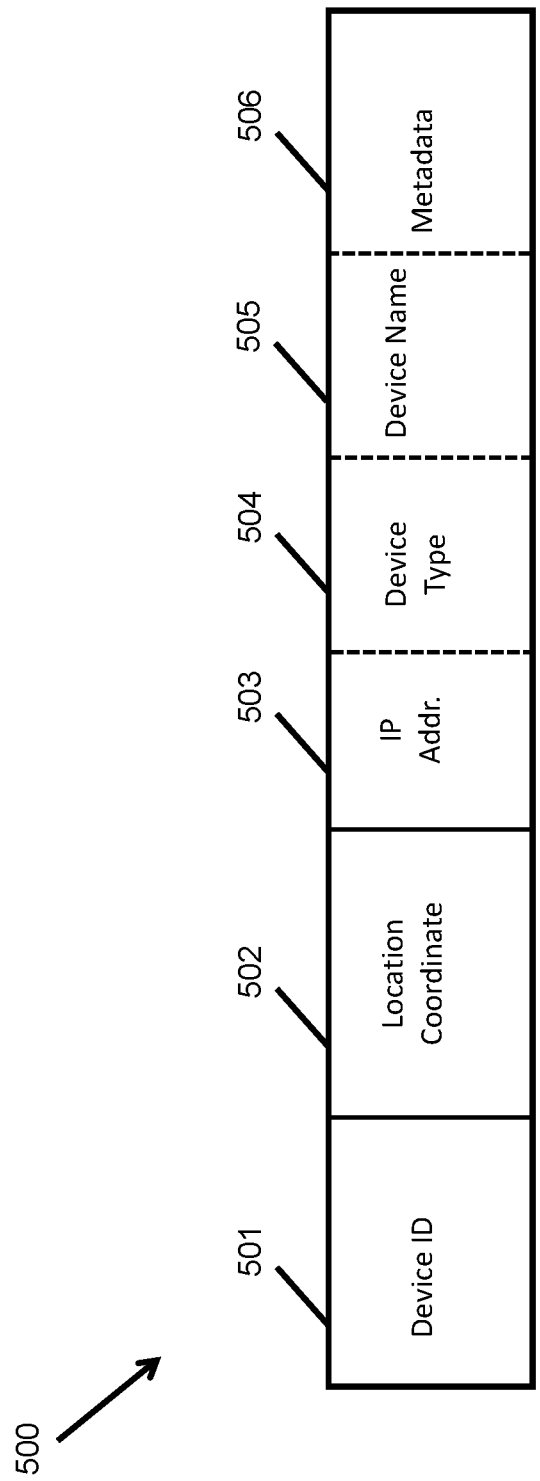
FIG. 5 is a conceptual representation of a static beacon in accordance with various examples.

FIG. 5 shows an example static beacon package 500 comprising a device identifier 501, location coordinates 502, an internet protocol (IP) address 503, a device type 504, a device-friendly name 505, and any additional metadata 506. The static beacon package 500 can be any combination of the above, and can further include additional data. The device identifier 501 can be a random value assigned during deployment that identifies the stationary device that broadcasts the static beacon package 500. The static beacon package 500 can be a tuple of the form <device identifier, location coordinate, IP address, device type, friendly name, custom metadata>. The location coordinates 502 are the static location coordinates (e.g., GPS coordinates) described above; the IP address 503 comprises the Internet Protocol address of the stationary device; the device type 504 specifies the type of device that the stationary device is (e.g., printer, workstation); the device-friendly name 505 may comprise a user-friendly name (e.g., Printer 1, Home Printer); and metadata 506 may be provided as is suitable. After the static beacon package 500 is formed, the stationary device starts broadcasting the static beacon in the radio spectrum to any device in its proximity. In an example method, provisioning a static beacon package 500 can include: 1) positioning a geo-location enabled device next to the device being provisioned; 2) manually collecting location coordinates using the geo-location enabled device; 3) entering the data required to form the static beacon package; 4) transmitting the data to the device being provisioned; and 5) broadcasting, by the provisioned device, the static beacon package.

The static beacons and the dynamic beacon packages are implemented for the trilateration of a signal and can be managed in a pure peer-to-peer manner without requiring a centralized server. When at least three beacon packages (static beacons, dynamic beacons, or a combination thereof) are provisioned and present in the same beacon coverage area (i.e., the extent of physical space in which the at least three beacon packages are detectable), the beacon packages form a mesh of devices that allow a fourth beacon to be positioned in space.

Figure 6:
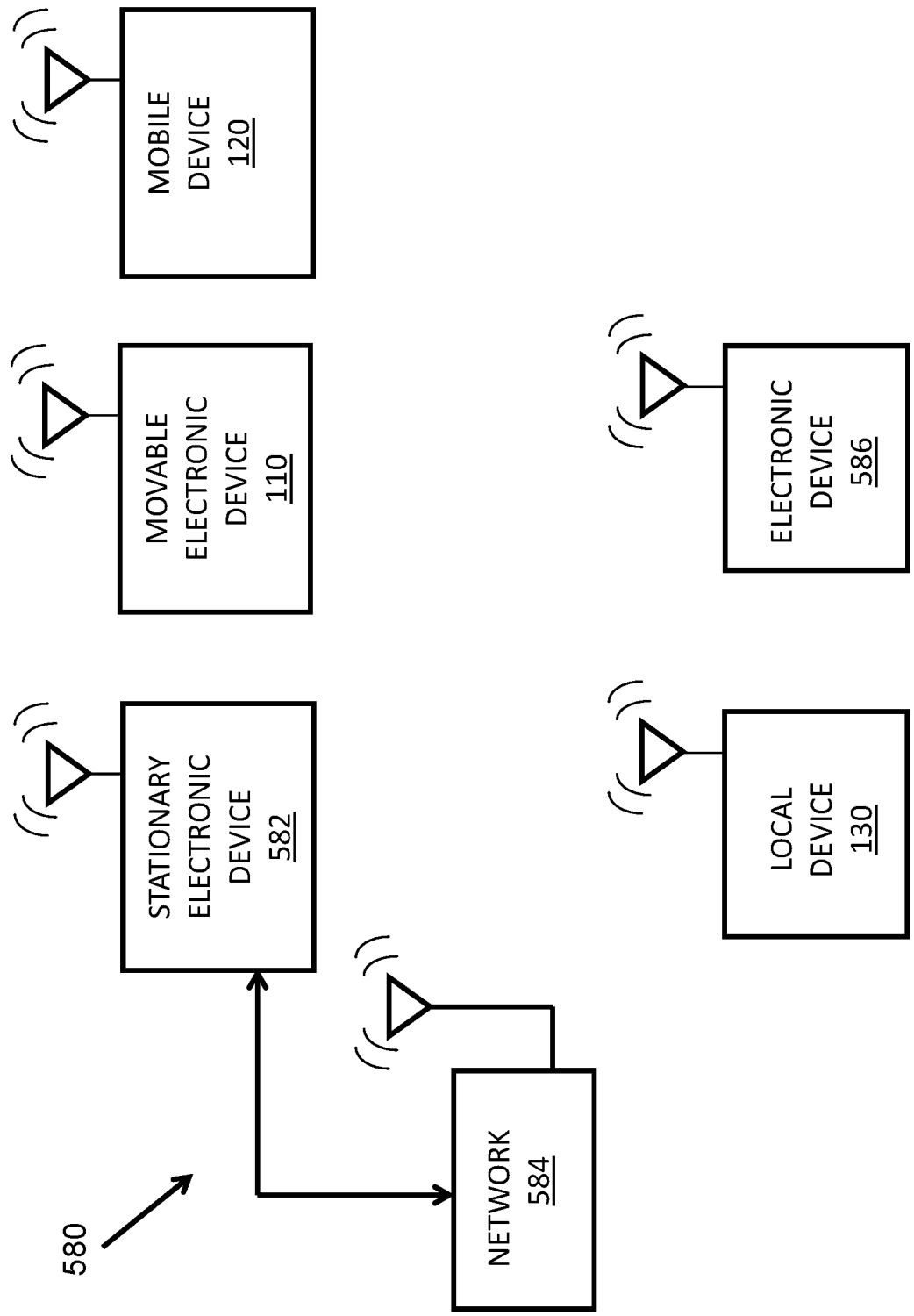
FIG. 6 depicts a trilateration system that is to implement the location method of FIG. 2, in accordance with various examples.

FIG. 6 depicts an example trilateration system 580. The system 580 comprises the movable electronic device 110, the mobile device 120, and the local device 130 from FIGS. 1, 3A and 3B. In addition, the system 580 includes a stationary electronic device 582 (such as that described above with respect to FIG. 5) coupled to a network 584 (e.g., an enterprise network). The system 580 additionally comprises an electronic device 586. Each of the devices shown in the system 580 is capable of wireless communication with the remaining devices. Each of these four devices in the system 580 comprises a processor and a non-transitory computer-readable medium (i.e., storage) storing executable code which, when executed, causes the respective processor to perform some or all of the actions attributed herein to the device housing that processor. The devices are not restricted to the types of devices that they have associated with above; for example, the local device 130 may be stationary or movable, as may be the case for the electronic device 586. The devices of system 580 are in a common beacon coverage area and thus are able to communicate with each other using any suitable wireless communication protocol. In the example shown, the movable electronic device 110 may obtain its location coordinates from the mobile device 120, and the stationary electronic device 582 may obtain its location coordinates from the network 584, as described above. Once at least three devices—such as the movable electronic device 110, the stationary electronic device 582, and the local device 130—are broadcasting beacon packages in the depicted beacon coverage area, a device—such as the electronic device 586—entering the beacon coverage area can trilaterate its position in space based on the static and dynamic beacon packages being broadcast in the area by the remaining three devices. The entering device is said to be within the particular beacon coverage area when the entering device is within peer-to-peer wireless communication range of the remaining three devices. Trilateration uses three known location coordinates to calculate the position of a point in space. Thus, the electronic device 586 may receive the beacon packages from the movable electronic device 110, the stationary electronic device 582, and the local device 130. The electronic device 586 performs a trilateration operation using the beacon packages from the other devices. A location of the electronic device 586 is determined using the trilateration operation and with respect to the other three devices.

Figure 7:
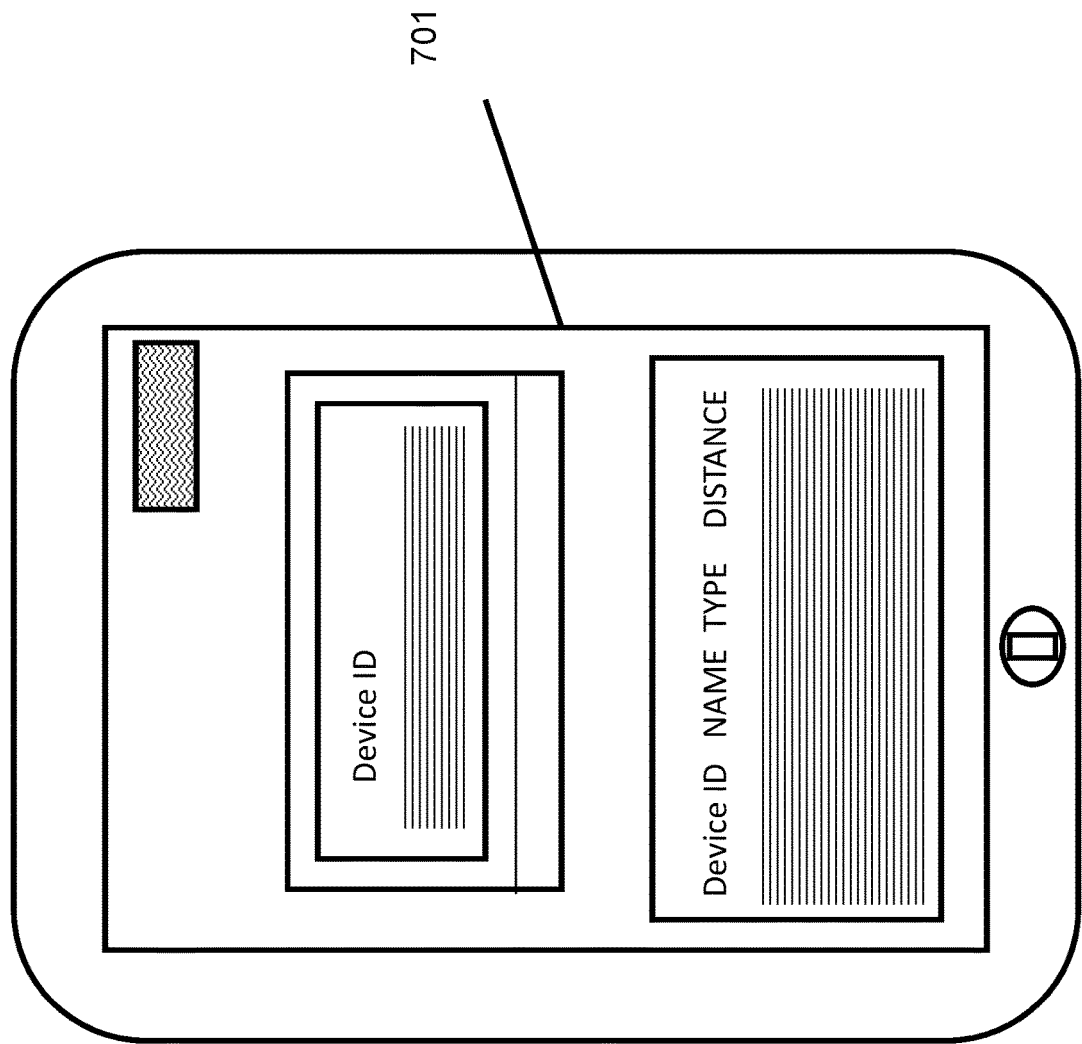
FIG. 7 depicts a display device to display information pertaining to devices in the trilateration system of FIG. 6, in accordance with various examples.

FIG. 7 depicts an example user interface 701 of the electronic device 586 that displays information regarding the other devices in the beacon coverage area after the trilateration operation is complete. As shown, the user interface 701 may display various types of information relating to each of the other three devices in the beacon coverage area, including device ID, device name, device type, and distance from the electronic device 586. The device ID, device name, and device type information may be contained in beacon packages, and distances may be determined using trilateration techniques. User selection of a particular category of information results in the display of detailed information (in this example, Device ID).

FIG. 8 depicts an example method 800 for positioning a device, such as the electronic device 586 in FIG. 6, entering a beacon coverage area with beacon packages being broadcast from at least three devices, such as the devices 110, 130, and 582. The method 800 comprises searching for and identifying beacon packages (e.g., static and/or dynamic) by the device identifier field in the beacon packages (step 802), parsing the location coordinates and the device types of the identified beacon packages (step 804), and presenting, to a user, devices found in proximity (i.e., in the same beacon coverage area, or within a predefined distance) of the device (step 806). Each of these steps may be performed, for example, by the electronic device 586 of FIG. 6. A listing of device types, distances, and other information can be provided to the user, for example, through the user interface 701 (FIG. 7). For example, a list of the closest printers and conference rooms can be displayed to the user of the electronic device 586.

Referring to FIG. 6, in some example implementations, the electronic device 586 is able to identify the locations of various electronic devices, such as the devices 110, 130, and 582, and to report information about such electronic devices (e.g., device IDs, device types, device locations) to a network administrator or server. In this manner, the systems and techniques described herein may be used to track a variety of electronic assets, such as laptop computers, tablets, notebooks, mobile phones, and e-readers. By tracking such electronic devices, personnel to whom the devices are assigned also may be tracked. Broadcasting dynamic beacon packages from devices that are at least temporarily stationary increases the coverage of the location system 100 without incurring additional costs to deploy dedicated beacon sources. Costs are further mitigated when electronic devices broadcast beacon packages containing location coordinates obtained from co-located mobile devices, as such leveraging of the mobile device positioning circuit (e.g., GPS unit) means that a positioning circuit does not need to be installed in the electronic device.

The above discussion is meant to be illustrative of the principles and various examples of the present disclosure. Numerous variations and modifications to the foregoing examples are possible. It is intended that the following claims be interpreted to embrace all such variations and modifications.

What is claimed is:

1. An electronic device, comprising:
  an accelerometer;
  a wireless transceiver to communicate data with a mobile device; and
  a processor to:
    determine, based on acceleration data from the accelerometer, whether the electronic device is stationary;
    receive an indicator from the mobile device, the indicator indicating that the mobile device is stationary; and
    in response to determining based on the acceleration data that the electronic device is stationary, and determining based on the indicator from the mobile device that the mobile device is stationary:
      obtain, from the mobile device, location coordinates of the mobile device;
      set the location coordinates of the mobile device as location coordinates of the electronic device;
      generate a beacon package comprising an identifier of the electronic device and the location coordinates of the electronic device;
      transmit the beacon package to a local device in proximity to the electronic device; and
      receive, at the electronic device, data transmitted by the local device responsive to the local device receiving the beacon package.

2. The electronic device of claim 1, wherein the indicator is based on sensor data of a sensor in the mobile device.

3. The electronic device of claim 1, wherein the processor is to not obtain location coordinates of the mobile device and not transmit a beacon package in response to determining either that the electronic device is not stationary or the mobile device is not stationary.

4. The electronic device of claim 1, wherein the processor is to cease transmission of the beacon package in response to the acceleration data indicating that the electronic device is not stationary.

5. The electronic device of claim 1, wherein the location coordinates of the mobile device comprise global positioning system (GPS) coordinates.

6. The electronic device of claim 1, wherein the electronic device is to perform short-range wireless communication with the mobile device.

7. The electronic device of claim 1, wherein the processor is to establish a Bluetooth pairing with the mobile device.

8. The electronic device of claim 1, wherein the beacon package further comprises at least one of a device type or a user identifier.

9. The electronic device of claim 1, wherein the transmitted beacon package is to a beacon coverage area that receives further beacon packages from other devices to allow a device entering the beacon coverage area to perform trilateration to obtain a position of the device.

10. The electronic device of claim 9, wherein the other devices comprise the mobile device and the local device.

11. An electronic device comprising:
  a wireless transceiver to communicate data with a mobile device; and
  a processor to:
    determine, based on sensor data of a sensor in the electronic device, that the electronic device is stationary;
    determine, based on an indicator received by the electronic device from the mobile device, that the mobile device is stationary; and
    in response to determining based on the sensor data that the electronic device is stationary, and determining based on the indicator that the mobile device is stationary:
      obtain, from the mobile device, location coordinates of the mobile device;
      set the location coordinates of the mobile device as location coordinates of the electronic device;
      generate a beacon package comprising an identifier of the electronic device and the location coordinates of the electronic device;
      transmit the beacon package to a local device in proximity to the electronic device; and
      receive, at the electronic device, data transmitted by the local device responsive to the local device receiving the beacon package.

12. The electronic device of claim 11, wherein the indicator is in a message from the mobile device.

13. The electronic device of claim 11, wherein the indicator is based on acceleration data from an accelerometer in the mobile device.

14. The electronic device of claim 11, wherein the transmitted beacon package is to a beacon coverage area that receives further beacon packages from other devices to allow a device entering the beacon coverage area to perform trilateration to obtain a position of the device.

15. The electronic device of claim 11, further comprising:
  the sensor that comprises an accelerometer,
  wherein the processor is to determine, based on acceleration data from the accelerometer, whether the electronic device is stationary.

16. The electronic device of claim 11, wherein the processor is to not obtain location coordinates of the mobile device and transmit a beacon package in response to determining either that the electronic device is not stationary or the mobile device is not stationary.

17. A non-transitory machine-readable storage medium encoded with instructions that upon execution cause an electronic device to:
  monitor acceleration data from an accelerometer of the electronic device;
  determine, based on the acceleration data from the accelerometer, whether the electronic device is stationary;
  receive an indicator from a mobile device, the indicator indicating that the mobile device is stationary; and
  in response to determining based on the acceleration data that the electronic device is stationary, and determining based on the indicator from the mobile device that the mobile device is stationary:
  obtain location coordinates of the mobile device from the mobile device;
  set the location coordinates of the mobile device as location coordinates of the electronic device;
  generate a beacon package comprising an identifier of the electronic device and the location coordinates of the electronic device;
  transmit the beacon package to a local device in proximity to the electronic device; and
  receive, at the electronic device, data transmitted by the local device responsive to the local device receiving the beacon package.

18. The non-transitory machine-readable storage medium of claim 17, wherein the instructions upon execution cause the electronic device to not obtain location coordinates of the mobile device and transmit a beacon package in response to determining that the electronic device is not stationary.

19. The non-transitory machine-readable storage medium of claim 17, wherein the transmitted beacon package is to a beacon coverage area that receives further beacon packages from other devices to allow a device entering the beacon coverage area to perform trilateration to obtain a position of the device.

20. The non-transitory machine-readable storage medium of claim 17, wherein the indicator is based on acceleration data of an accelerometer in the mobile device.

* * * * *